US010187700B2

(12) United States Patent
Foerster et al.

(10) Patent No.: US 10,187,700 B2
(45) Date of Patent: *Jan. 22, 2019

(54) OPTIMIZING TIMING OF DISPLAY OF A VIDEO OVERLAY

(71) Applicant: Google LLC, Mountain View, CA (US)

(72) Inventors: Jakob Foerster, Zurich (CH); Dhruv Bakshi, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,195

(22) Filed: Nov. 13, 2017

(65) Prior Publication Data
US 2018/0070145 A1 Mar. 8, 2018

Related U.S. Application Data

(63) Continuation of application No. 14/095,519, filed on Dec. 3, 2013, now Pat. No. 9,820,004.

(51) Int. Cl.
H04N 21/488 (2011.01)
H04N 21/442 (2011.01)
H04N 21/81 (2011.01)
G06Q 30/00 (2012.01)

(52) U.S. Cl.
CPC ........... H04N 21/488 (2013.01); G06Q 30/00 (2013.01); H04N 21/44213 (2013.01); H04N 21/44218 (2013.01); H04N 21/8126 (2013.01)

(58) Field of Classification Search
CPC ........... H04N 21/488; H04N 21/44213; H04N 21/44218; H04N 21/8126
See application file for complete search history.

(56) References Cited

U.S. PATENT DOCUMENTS

| 8,180,667 | B1 | 5/2012 | Beluja et al. |
| 8,942,542 | B1 | 1/2015 | Sherrets et al. |
| 9,088,823 | B1 | 7/2015 | Price |
| 2008/0141318 | A1 | 6/2008 | Kim et al. |

(Continued)

OTHER PUBLICATIONS

Notice of Allowance dated Jul. 7, 2017 in U.S. Appl. No. 14/095,519.

(Continued)

Primary Examiner — Mushfikh I Alam
Assistant Examiner — Adil Ocak
(74) Attorney, Agent, or Firm — Byrne Poh LLP

(57) ABSTRACT

The timing for displaying an overlay a video is optimized using a system that includes an engagement component that receives information regarding frames of a video at which respective users of a plurality of users stop engaging with the video and an analysis component that calculates user engagement scores for the frames based on the information, wherein the user engagement scores reflect a percentage of the plurality of users that stop engaging with the video at the respective frames, and wherein the higher the percentage the lower the user engagement score. The system further includes an identification component that identifies a subset of the frames associated with relatively lower user engagement scores in comparison to other frames of the video and an overlay component that configures an overlay for displaying over the video near at least one of the frames included in the subset.

21 Claims, 11 Drawing Sheets

(56) References Cited

U.S. PATENT DOCUMENTS

| | | |
|---|---|---|
| 2010/0050202 A1 | 2/2010 | Kandekar et al. |
| 2010/0287580 A1 | 11/2010 | Harding et al. |
| 2011/0219403 A1 | 9/2011 | Nesamoney et al. |
| 2012/0095825 A1 | 4/2012 | Mei et al. |
| 2013/0174007 A1* | 7/2013 | Demarco ........... H04N 21/4825 |
| | | 715/230 |
| 2014/0289594 A1 | 9/2014 | Iampietro et al. |
| 2014/0325540 A1 | 10/2014 | de la Garza et al. |

OTHER PUBLICATIONS

Office Action dated Jan. 12, 2016 in U.S. Appl. No. 14/095,519.
Office Action dated Jan. 12, 2017 in U.S. Appl. No. 14/095,519.
Office Action dated Jan. 18, 2017 in U.S. Appl. No. 14/095,519.
Office Action dated Mar. 21, 2016 in U.S. Appl. No. 14/095,519.
Office Action dated Apr. 24, 2015 in U.S. Appl. No. 14/095,519.
Office Action dated Aug. 31, 2015 in U.S. Appl. No. 14/095,519.
Office Action dated Oct. 23, 2014 in U.S. Appl. No. 14/095,519.

* cited by examiner

OPTIMIZING TIMING OF DISPLAY OF A VIDEO OVERLAY

CROSS-REFERENCE TO RELATED APPLICATIONS

This application is a continuation of U.S. patent application Ser. No. 14/095,519, filed Dec. 3, 2013, which is hereby incorporated by reference herein in its entirety.

TECHNICAL FIELD

This application generally relates to systems and methods for optimizing the timing at which an overlay is displayed over a video.

BACKGROUND

Overlays are displayed over videos for various reasons. For example, overlays can be displayed over a video to provide viewers with links to additional information about the video, to provide links to other related videos, to provide links to content associated with the video, or to present advertisements. In some aspects, an overlay can be configured for constant display over a video as the video plays. In other aspects, an overlay can be configured for displaying over a video at various points in the video and for various lengths of time depending on the purpose of the overlay. For example, an overlay can be integrated within a video to entice viewers to select the overlay before exiting a current video in which the overlay is displayed. Manually analyzing a video to strategically determine where to integrate an overlay and how long to display the overlay can be time consuming for a user. Such a task becomes significantly arduous when a user desires to strategically integrate overlays over many different videos, such as a plurality of videos associated with a user profile or channel.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
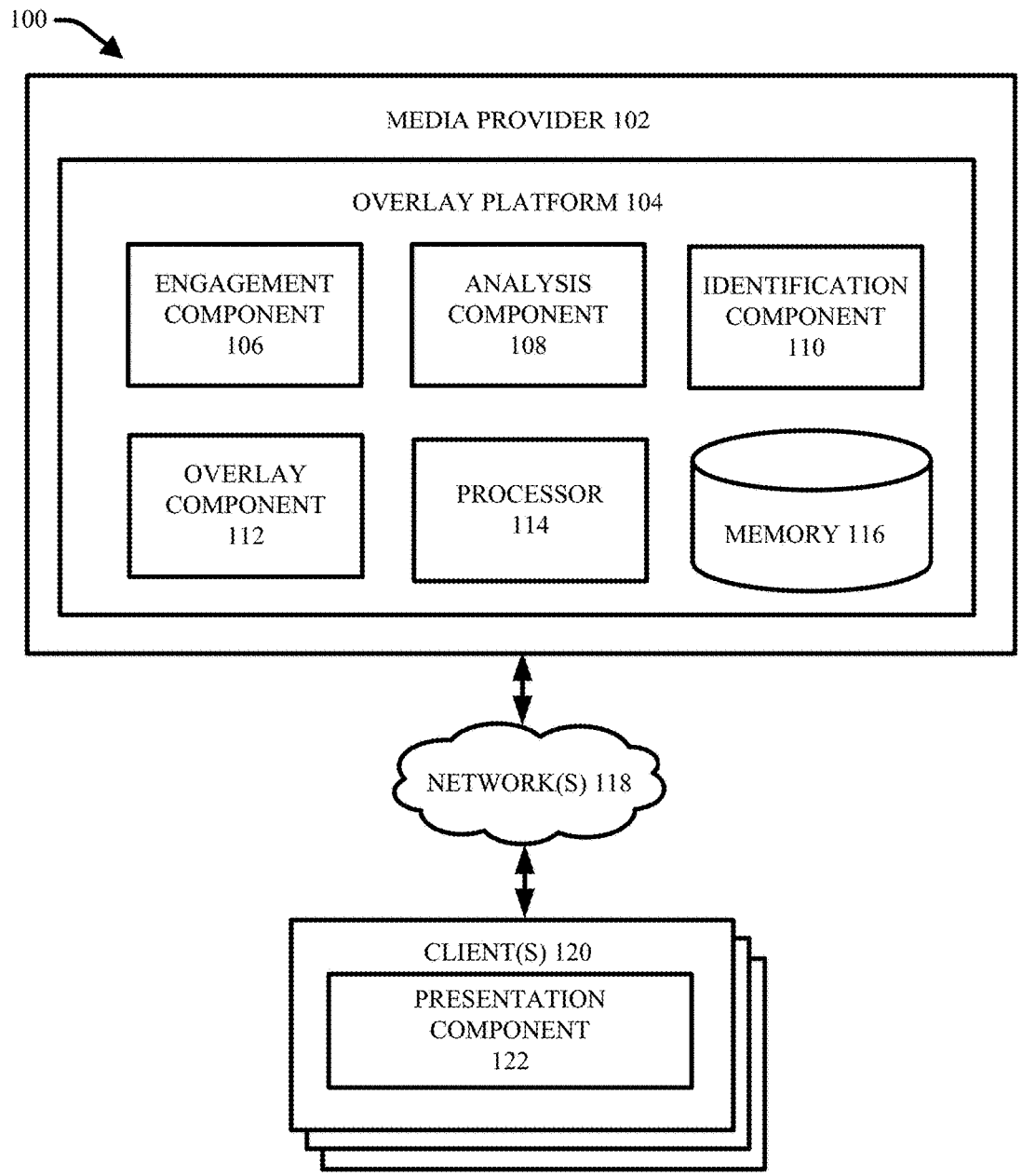
FIG. 1 illustrates an example system for optimizing the timing at which an overlay is displayed over a video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for optimizing the timing at which an overlay is displayed over a video in accordance with various aspects and embodiments described herein. As used herein, an overlay refers to a data object that is displayed over a video while the video is playing or paused. An overlay can include a graphical element or icon that is displayed over or within image data of a video within the dimensions of the display area (e.g., video player) in which the video is played. For example, an overlay can include an image, a thumbnail, an icon, text, an animation or an embedded video. In some aspects, the overlay can include a link or a hyperlink that can be selected. For example, an overlay displayed over a video can include a link to another video, a link to another data object, or a link to an external information source.

Overlays are integrated over videos for various reasons. For example, overlays can be displayed over a video to provide viewers with links to additional information about the video, to provide links to other related videos, to provide links to content associated with the video, or to present advertisements. In some aspects, an overlay can be configured for constant display over a video as the video plays. In other aspects, an overlay can be configured for displaying over a video at various points in the video and for various lengths of time depending on the purpose of the overlay. For example, an overlay can be integrated within a video to entice viewers to select the overlay before exiting a current video in which the overlay is displayed. According to this example, the overlay can include a link to a related video or another data object that is configured to open in a new window or tab and/or replace the video in which the link is displayed, in response to selection of the link.

Identifying an optimal point in a video to display an overlay for the purpose of enticing viewers to select the overlay before exiting a current video in which the overlay is displayed, can be difficult. For example, if the overlay is presented too early in the video, the viewer may not select the overlay if they are not ready to stop watching the current video. In this scenario, the viewer will likely be annoyed and distracted by the overlay. In another example, if the overlay is presented too early in the video, the viewer may select the overlay and prematurely stop watching the current video. However, an owner or promoter of the video may have preferred the viewer continue watching the current video rather than selecting the overlay. In this scenario, the owner or promoter of the video may only want a viewer to select an overlay integrated within a video as an alternative to exiting the video. In yet another example, if the overlay is presented at a point in a video after which the viewer stops watching the video, the user will never see the overlay.

Manually analyzing a video to strategically determine an optimal point in the video to integrate an overlay and how long to display the overlay can be time consuming for a user. Such a task becomes significantly arduous when a user desires to strategically integrate overlays over many different videos, such as a plurality of videos associated with a user profile or channel.

The disclosed systems and methods employ viewer retention data to automatically identify an optimal point or points in a video in which to display an overlay to entice viewers to select the overlay before exiting the current video in which the overlay is displayed and to reduce negative viewership impacts associated with displaying the overlay too early in the video. As used herein, retention data refers to information that indicates points in a video where viewers tend to stop engaging with or watching a video. In an aspect, this retention data can be obtained from watch histories of a plurality of users. For example, watch histories of a plurality of users that have selected a video for playing can be analyzed to identify segments or frames, (referred to herein as drop off points), in the video where the respective viewers stopped engaging with or watching the video. These drop off points can then be analyzed to identify segments or frames of the video associated with high drop off values. A drop of point or points associated with relatively high drop off values can then be selected as an optimal point or points in the video to integrate an overlay for the purpose of enticing future viewers to select the overlay before dropping off (e.g., before exiting or stopping the video).

The subject systems and methods for identifying an optimal point or points in a video for displaying an overlay are based in part on the following two assumptions: 1.) When viewers drop off the current video during playback they are likely to be wanting to discover new content; and 2.) In order to lead viewers to new content via an overlay displayed over a current video during playback, the viewers need to be engaging with the current video at the time the overlay is displayed (e.g., have their focus on the video player playing the video) so they are more likely to see the overlay in the first place.

In an aspect, after an optimal point or points in a video to display an overlay have been identified, the overlay can be automatically integrated within the video. Accordingly, overlays can be automatically and strategically integrated within different videos at an optimal point or points in the respective videos (e.g., where the optimal point or points in the respective videos can and will likely differ) without manual user intervention. In another aspect, after an optimal point or points in a video to display an overlay have been identified, the disclosed system and methods can provide the information to an owner or promoter of the video and suggest the owner or promoter of the video integrate the overlay at the optimal point or points identified.

In one or more aspects, a system is provided that includes an engagement component that receives information regarding frames of a video at which respective users of a plurality of users stop engaging with the video and an analysis component that calculates user engagement scores for the frames based on the information, wherein the user engagement scores reflect a percentage of the plurality of users that stop engaging with the video at the respective frames, and wherein the higher the percentage the lower the user engagement score. The system further includes an identification component that identifies a subset of the frames associated with relatively lower user engagement scores in comparison to other frames of the video and an overlay component that configures an overlay for displaying over the video near at least one of the frames included in the subset.

In another aspect, a method is disclosed that includes using a processor to execute computer executable instructions stored in a memory to perform acts including receiving information regarding segments of a video at which respective users of a plurality of users stop engaging with the video and calculating user engagement scores for the segments based on the information, wherein the user engagement scores reflect a percentage of the plurality of users that stop engaging with the video at the respective segments, and wherein the higher the percentage the lower the engagement score. The acts can further include identifying a subset of the segments associated with relatively lower user engagement scores in comparison to other segments of the video and configuring an overlay for displaying over the video near at least one of the segments included in the subset.

Further provided is a tangible computer-readable storage medium comprising computer-readable instructions that, in response to execution, cause a computing system to perform various operations. The operations include at least, receiving information regarding segments of a video at which respective users of a plurality of users stop watching a video, and calculating user engagement scores for the segments based on the information, wherein the user engagement scores reflect a percentage of the plurality of users that stop watching the video at the respective segments, and wherein the higher the percentage the lower the user engagement score. The operations further include identifying one of the segments associated with a relatively lower user engagement score in comparison to other segments of the video, and configuring an overlay for displaying over the video near the one of the segments.

Referring now to the drawings, with reference initially to FIG. 1, presented is a diagram of an example system 100 for optimizing the timing at which an overlay is displayed over a video, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, one or more client devices 120 and one or more networks 118 for connecting the one or more client devices 120 with media provider 102. Media provider 102 includes overlay platform 104 to facilitate integrating overlays onto videos provided by media provider 102 in accordance with aspects described herein. Overlay platform 104 includes memory 116 for storing computer executable components and instructions. Overlay platform further includes a processor 114 to facilitate operation of the instructions (e.g., computer executable components and instructions) by overlay platform.

Media provider 102 can include an entity that provides media content (e.g., video, streaming video, images, thumbnails or other static representations of video) to client device(s) 120 via a network 118 (e.g., the Internet). A client device 120 can include presentation component 122 to generate a user interface (e.g., a graphical user interface or virtual interface) that displays media content provided by media provider 102 to a user of the client device 120. In particular, presentation component 122 can play videos provided by media provider 102 as streamed to client device 120. In accordance with aspects described herein, the videos can include overlays which are also presented by presentation component 122. In an aspect, presentation component 122 can include an application (e.g., a web browser) for retrieving, presenting and traversing information resources on the World Wide Web. For example, media provider 102 can provide and/or present media content to client device 120 via a website that can be accessed using a browser of the client device 120. In an aspect, the media content can be presented and/or played at client device 120 using a video player associated with media provider 102 and/or client device 120.

As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an aspect, media provider 102 can employ one or more networked computing devices to store media content and deliver media content to users via a network 118. The media content can be stored in memory associated with media provider 102 and/or at various networked devices employed by media provider 102 and accessed via a client device 120 using a web based platform or cellular application platform of the media provider 102. For example, media provider 102 can include a media presentation source that has access to a voluminous quantity (and potentially an inexhaustible number) of shared media (e.g., video and/or audio) files. The media presentation source can further stream these media files to one or more users at respective client devices 120 of the one or more users over a network 118.

A client device 120 can include any suitable computing device associated with a user and configured to interact with media provider 102, and/or overlay platform 104. For example, a client device 120 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 100 (or additional systems described in this disclosure) using client device 120.

Network(s) 118 can include wired and wireless networks, including but not limited to, a cellular network, a wide area network (WAD, e.g., the Internet), a local area network (LAN), or a personal area network (PAN). For example, client device 120 can communicate with media provider 102 and/or overlay platform 104 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

To facilitate identifying an optimal point or points in a video to display an overlay and configuring the overlay for display at the optimal point or points, overlay platform 104 can include engagement component 106, analysis component 108, identification component 110, and overlay component 112.

Engagement component 106 is configured to receive engagement information regarding user engagement in respective segments or frames of a video. The term video segment refers to a portion of a video less than the whole video. The term video frame refers to one of the plurality of sequential images which compose the complete moving picture of a video. Thus in an aspect, a video frame is a video segment. However, as generally used herein, the term video segment refers to a portion of a video including two or more sequential video frames. For example, a video can segment can include a portion of a video including frames numbers 1-24, 100-200, or 1-240 (e.g., where the frame rate is 24 frames per second (fps) and a video is segmented into 10 second intervals). In an aspect, engagement component is configured to receive or group engagement information based on 10 second intervals or windows. In other words, the video is divided into a plurality of sequential 10 second segments and engagement information is respectively associated with each of the 10 second segments. According to this example, a video segment can include a portion of a video from time marker 1:10:00 to 1:20:00. It should be appreciated however that the manner in which a video is segmented can vary.

In an aspect, engagement information received by engagement component 106 includes user retention data based on watch histories of a plurality of users. For example, engagement component 106 can receive information based on watch histories of a plurality of users that began watching a video indicating respective frames or segments of the video at which the respective users stopped watching the video. These segments or frames of the video are referred to herein as the drop of points in the video (e.g., points in the video where a viewer drops off or stops watching the video). In an aspect, information identifying a point in a video where the user stops watching the video can be extracted from watch history data that clearly indicates the user has interacted with a video (or video player, interface including a video player, etc.) in a manner to cause the video to stop playing or streaming to the device of the user. For example, the watch history data can indicate the user selected a stop command of the video player playing the video, closed a window or tab in which the video was being played, or opened another data object that replaced the current video being played.

In another aspect, in addition to user retention data that clearly indicates a user has stopped watching a video (e.g., stopped playing the video or receiving the video as streamed to the user device), engagement component 106 can receive other information indicative of user disengagement or engagement with respective segments or frames of the video. For example, although a video may not have stopped playing, the user may simply not be paying attention to or engaging with the video. According to this aspect, engagement component 106 can receive various signals regarding whether a user is engaged or disengaged with a segment or frame of a video as the video is being played. These signals are referred to herein as user engagement signals. User engagement signals can also indicate a level of user disengagement or engagement with a segment or frame of a video. Accordingly, user engagement signals can be employed to track points in a video where a user begins to lose interest until the user ultimately stops watching the video entirely.

For example, the various manners in which a user controls the playing of a video, aside from stopping the playing of the video, can indicate different levels of user engagement/disengagement with different parts of the video. According to this example, engagement component 106 can collect/receive user engagement signals including but not limited to: segments of a video at which a user pauses a video, segments of a video at which a user resumes playing of a paused video, segments of a video a user rewinds or fast forward past, segments of a video a user seeks forward or backward past, segments of a video a user rewinds or fasts forward to, segments of a video a user seeks backward or seeks forward to, segments of a video a user re-watches and number of times the user re-watches, segments of the video a user increases the volume of, and segments of a video a user decreases the volume of. For example, seeking forward and/or fast forwarding past certain segments of a video can indicate that the user is not engaged by those certain segments. However, seeking forward or fast forwarding to a specific part of a video can indicate engagement with the specific part of the video. Similarly, seeking backward or rewinding past parts of a video can indicate a level of disinterest or disengagement with those parts of the video. However, a part of a video a user seeks backward or rewinds to is likely considered interesting by the user. In another example, muting or reducing the volume of a video can indicate a level of disengagement while increasing the volume of can indicate a level of engagement.

Engagement component 106 can also receive user engagement signals related to whether a user is looking at a video or looking away from a video during respective segments or frames of the video. For example, client device 120 (or an auxiliary device) can include gaze detection hardware and/or software configured to determine whether a user is looking at a video displayed at the client device 120. According to this example, as a user is watching a video, engagement component 106 can receive user engagement signals that provide information indicating what segments of a video the user is looking at and what segments of the video the user is not looking at. More specifically, engagement component 106 can receive information regarding what segments of a video causes a user who is looking at a video to lose interest and look away from the video.

In an aspect, engagement component 104 can and/or client device 120 (or an auxiliary device) can employ voice recognition software and/or hardware to interpret words spoken by a viewer during playback of the video that can indicate a level of user engagement or disengagement with the video. For example, as a user is watching a particular part of a video with a friend, the user may ask questions about the particular part of the video or discuss the particular part of the video with the friend. This activity by the user can indicate the user is engaged in the particular part of the video. In another example, as a user is watching a video with a friend, the user may carry on a conversation about his or her dinner they cooked earlier in the evening, a conversation entirely irrelevant to the subject matter of the video. Such user activity can provide an indication that the user is not interested in the video during the particular segment of the video he or she is talking about the dinner he or she cooked. According to this aspect, engagement component 106 can receive and analyze words spoken by a user while watching a video. The particular words spoken by a user during a particular segment of a video can later be analyzed by analysis component 108 to facilitate determining a level of user engagement or disengagement with the particular segment of the video.

Engagement component 106 can also receive user engagement signals related to movement of a user with respect to a client device 120 at which a video is being played. According to this aspect, client device 120 can include motion and/or proximity sensors configured to detect and interpret user movement. Various types of user movements during watching a video can provide indication of user engagement or disengagement with the video. For example, engagement component 106 can receive information indicating when a user leaves and returns to the room in which a video is being played at client device 120. According to this example, the user movement information can indicate a level of user disinterest in the part of the video being played at the time the user leaves the room and a level of interest in the part of the video occurring at the point of the user returns to the room In another example, engagement component 106 can receive information indicating when a user moves closer to (e.g., leans in to watch intently, providing an indication of user engagement) or away from a display screen (e.g., providing an indication of user disengagement) at which a video is being played during the course of the video. In yet another example, engagement component 106 can receive information regarding when a user jumps in excitement in response to a part in a video (indicating user engagement) or falls asleep during a certain part of a video (indicating user disengagement).

In some aspects, a user can watch a video on a handheld client device 120 (e.g., a smartphone or tablet PC). According to these aspects, the handheld client device can include motion and/or positional sensors that detect movement of the device and engagement component 106 can receive information regarding movement of the handheld device at which a video is being played. This information can also be received and interpreted by engagement component 106 as user engagement signals (e.g., information that provides an indication of whether a user is engaged or disengaged in certain parts of a video). For example, if a user is walking and watching a video on his or her smartphone, the user may stop walking to intently watch a part of the video that grabs his or her attention (indicating user engagement). In another example, if a user is holding his or her phone upside during a part of the video, this is a good indication the user is not paying attention to the part of the video.

Engagement component 106 can further collect or receive user engagement signals relating to visibility of a video (or video player playing the video) to a user at an interface of a client device 120. For example, although a video may be open and playing at a client device 120, the video may not be visible to the user because the window or tab in which the video is displayed is covered or partially covered by another window or tab open in the user interface. In another example, the window or tab in which the video is displayed may be minimized or reduced to a size that makes the video difficult to see clearly. According to these examples, engagement component 106 can receive user engagement signals related to visibility of a video to a user at a given point in the video based on the arrangement, configuration and size of objects displayed at the user interface in which the video is displayed. Information indicating whether a video is visible to a user during the playing of certain parts or segments can further indicate whether the user is engaged or disengaged in the certain parts or segments of the video.

For example, a user can have a video playing in a first window and have word processing application open in another window. The user can further switch between maximizing and minimizing the window with the video and the window with the word processing application based on when the user is engaged in a part of a video. For example, a user may have the video window maximized during a first part of the video. When the user loses interest in the first part of the video, the user may minimize the video window and maximize the word processing application window instead.

Analysis component 108 is configured to analyze information received or collected by engagement component 106 for a plurality of viewers of a video and determine levels of user engagement (e.g., based on the data from the plurality of viewers) associated with respective frames or segments of the video. In an aspect, an analysis component 108 is configured to determine or infer user engagement values or scores for respective frames or segments of a video based on the received user engagement information. According to this aspect, analysis component 108 can calculate user engagement scores for respective sequential segments of a video using one or more algorithms stored in memory 116 that relate user retention data and/or user engagement signals associated with the respective segments, (as received from a plurality of viewers), to a level of user engagement in the respective segments. According to this example, the segments of the video can be previously defined or analysis component 108 can divide the video into a plurality of segments to analyze and group received user engagement information with the respective segments (e.g., 5 second segments, 10 second segments, 15 second segments, etc.). According to this aspect, a high user engagement value/score can be associated with a high level of user engagement and a low user engagement value/score can be associated with a low level of or engagement. In other words, the lower the engagement value/score the greater level of disengagement.

In an aspect, analysis component 108 can calculate different scores/values to associate with respective segments of a video based on the type of information analyzed and/or the algorithm employed. For example, analysis component 108 can calculate first scores for respective video segments that reflect only user retention information and second scores for the video segments that reflect user retention information and additional user engagement signals. In another example, analysis component can calculate different user engagement scores for respective segments of a video for different groups of people (e.g., where a group of people can be categorized based on preferences, interests, demographics, location, social affiliations/circles, etc.). According to this example, analysis component 108 can analyze user engagement signals received from people of a first demographic (e.g., based on age group, gender, political affiliation, marital status, ethnicity, etc.) and calculate user engagement scores for respective video segments that reflect how people from the first demographic find the respective segments of the video engaging/disengaging. Similarly, analysis component 108 can analyze user engagement signals received from people of a second demographic and calculate user engagement scores for respective video segments that reflect how people from the second demographic find the respective segments of the video engaging/disengaging.

In an aspect, based on user retention information, analysis component 108 can calculate user engagement scores for respective segments of a video that indicate areas of the video where relatively large clusters or percentages of viewers tend to drop off or stop watching the video. In particular, based on user retention information from a plurality of users that began watching a video, analysis component 108 can calculate user engagement scores for respective segments or frames of the video that reflect percentages of the plurality of users that stopped engaging with the video at the respective segments, wherein the higher the percentage the lower the engagement score. In other words, a segment of a video where a relatively large number of viewers tend to lose interest and stop watching the video will be associated with a low user engagement score.

According to this aspect, analysis component 108 can calculate engagement scores can reflect absolute percentages of viewers that drop off or stop watching the video at the respective segments and/or relative percentages of viewers that drop off or stop watching the video at the respective segments. Absolute percentages of viewers that drop off refer to the number of users that drop off at respective segments of the video relative to the entire number of users that began watching the video. Relative percentages of viewers that drop off refers to the number of users that drop off at respective segments of the video with respect to the number of viewers, (with respect to the total number of user that began watching the video), remaining engaged with or watching the video at the respective segments. High absolute and relative percentage drop of values reflect low levels of user engagement. Thus high absolute and relative percentage drop of values translate into low user engagement scores.

For example, where 100 people start watching a video, at a first segment occurring between time 00:02:00 and time 00:02:10, 10 people drop off. Here, the absolute drop off score of the first segment is 10% (10/100 people) and the relative drop of score is also 10% (10/100 people). As the video continues playing, by the time the video reaches a second segment between time 00:24:00 and time 00:24:10, only 20% (or 20 viewers) of the viewers who initially started watching the video remain (or have not dropped off). At the second segment, 10 more people drop off. Here, the absolute drop off score of the second segment is 10% (e.g., 10/100 people). However, the relative drop off score is 50% (e.g., 10/20 people).

In addition to user retention data, analysis component 108 can analyze user engagement signals associated with different frames or segments of a video from a plurality of users to determine user engagement scores associated with the different frames or segments of the video. Analysis component 108 can employ various algorithms and/or look-up tables stored in memory 116 that relate the various user engagement signals described above to levels of user engagement/disengagement. For example, signals associated with muted volume and poor visibility can relate to a low user engagement score indicating the user is not engaged with video. However, signals associated with gazing at a video player while the video player is maximized and visible can related to a high user engagement score indicating the user is engaged with the video.

Identification component 110 is configured to identify one or more frames or segments of a video for integration of an overlay based on the user engagement scores respectively associated therewith. In particular, identification component 110 is configured to identify one or more segments or frames of a video associated with relatively lower user engagement scores in comparison to other frames or segments of the video. These one or more segments associated with relatively low user engagement scores reflect low user engagement or interest in the respective segments. After identification component 110 has identified one or more video segments or frames having relatively low user engagement scores, overlay component 112 can configure an overlay for displaying at or near the one or more segments of the video when the video is played to entice future users to select the one or more overlays before disengaging with the video.

For example, as discussed above, in an aspect, a video segment associated with a relatively low user engagement score can indicate that a relatively large percentage of the viewers that have viewed the video including the segment tend to drop off or stop watching the video at or near the segment. Accordingly, by inserting an overlay for displaying over the video at or near the segment (e.g., just before the segment), when future users view the video, they can be enticed to select the overlay before dropping off or stopping the video. Thus, by allowing the owner or promoter of the video to select or influence the content of the overlay, the owner/promoter of the video can direct viewers to additional content selected by the owner/promoter of the video. For example, the owner/promoter of the video can select an overlay that includes a link to additional content the owner or promoter of the video is affiliated with (e.g., another video provided by the owner/promoter, a profile webpage or channel webpage associated with the owner/promoter, a website associated with the owner/promoter, etc.) to cross-promote additional content provided by the owner/promoter of the video.

Identification component 110 can employ various algorithms and look-up tables to influence identification or selection of video frame/segments based on the user engagement scores respectively associated therewith. For example, identification component 110 can be configured to identify the video frame or segment associated with the lowest user engagement score with respect to the other video frames/segments of the video. In another example, identification component 110 can be configured to identify a number N (e.g., three, five, ten, etc.) of the video frames/segments associated with the N lowest user engagement scores. In another example, identification component 110 can rank respective segments or frames of the video based on the user engagement scores associated therewith (e.g., from highest score to lowest score or vice versa).

In yet another example, where each of the segments/frames of a video are associated with multiple engagement scores that reflect different parameters or algorithms employed to calculate the respective engagement scores, identification component 110 can filter the segments based on the different parameters or algorithms. For instance, each of the segments of a video can be associated with an absolute percentage drop of value and a relative percentage drop of value or each of the segments can be associated with an engagement score reflective of a first user demographic and another engagement score reflective of a second user demographic. According to this example, identification component 110 can identify segments associated with relatively lower user engagement scores with respect to each of the different scores associated therewith. For instance, identification component 110 can identify a segment of the video associated with a highest absolute percentage drop of value (where a high percentage drop of value reflects low user engagement) and another segment of the video associated with a highest relative drop off value. Similarly, identification component 110 can identify a first set of three of the video segments associated with the lowest user engagement scores with respect to the first demographic and a second set of three of the user engagement scores associated the lowest user engagement scores with respect to the second demographic. Identification component 110 can further identify overlap between the segments included in the first set and the second set.

It should be appreciated that identification component 110 can employ various different algorithms and/or look up tables (e.g., stored in memory 116) to facilitate identifying and/or filtering video segments/frames based on the user engagement scores associated therewith and the purpose of the overlay to be integrated for displaying over the video at or near the segments identified by identification component 110.

Overlay component 112 is configured to configure an overlay for displaying at or near (e.g., just before) one or more of the video segments identified by identification component 110 based on the engagement scores respectively associated therewith. In particular, overlay component 112 can configure an overlay for displaying over a video beginning at or near one or more segments of the video included in a subset of video segments identified by identification component 110 as having relatively lower user engagement scores than other segments of the video. For example, overlay component 112 can configure an overlay for displaying over a video beginning at or near (e.g., just before) a segment of the video having the lowest user engagement score with respect to the other segments of the video. In another example, overlay component 112 can be configured to insert an overlay for displaying over a video during a sequential subset of video frames or segments associated with relatively low user engagement scores (as identified by identification component 110). In another example, overlay component 112 can configure multiple overlays for displaying at or near different segments of the video associated with relatively low user engagement scores. According to this example, overlay component 112 can configure overlays for displaying at or near each of the video segments having the top N lowest user engagement scores. Each of the overlays can be the same or different and each of the N top lowest user engagement scores can be located at different points in the video.

In another example, overlay component 112 can configure an overlay for displaying over a video based on engagement scores associated with the respective segments of the video and a parameter for which the engagement scores are based. For example, overlay component 112 can configure a first overlay for displaying over a video at or near a first segment of the video associated with a lowest user engagement score, wherein the user engagement scores are based on a first demographic. Overlay component 112 can also configure a second overlay for displaying over the video at or near a second segment of the video associated with a lowest engagement score, wherein the user engagement scores are based on a second demographic. According to this example, the first and second overlays can be tailored to the first and second demographics and the first and second segments can be different. Accordingly, where the video is played to a user, the overlay that is presented and the point in the video where the overlay is presented can be tailored to the users demographic.

Similarly, overlay component 112 can configure an overlay for displaying at or near a segment of a video associated with a highest absolute percentage drop off value or for displaying at or near a segment of a video associated with a highest relative percentage drop off value. In an aspect, overlay component 112 can configure an overlay for displaying at or near a segment of a video associated with a highest absolute percentage drop off value in order to maximize a total number of clicks or selections of the overlay (e.g., regardless of the number of viewers who see the overlay). In another aspect, overlay component 112 can configure an overlay for displaying at or near a segment of a video associated with a highest relative percentage drop off value in order to maximize a selection rate or click through rate (CTR) of the overlay (e.g., maximize selection of the overlay with respect to the number of viewers that see the overlay).

In an aspect, in addition to configuring a point or points in a video for initially displaying an overlay, overlay component 112 can also configure the position and size of the overlay. For example, where a video is displayed via a rectangular display interface, overlay component 112 can configure the overlay for displaying at any one of the four corners of the display interface or in the center of the display interface based in part on the user engagement score associated with the video segment or segments over which the overlay is displayed. Similarly, overlay component can modify the size, color or appearance of the overlay based in part on the user engagement score associated with the video segment or segments over which the overlay is displayed. For example, where the overlay is configured for displaying over a video at or near a segment having substantially low user engagement score, the overlay component can configured the overlay to appear large and in the center of the display screen to increase the chances of the viewer seeing and selecting the overlay.

Figure 2:
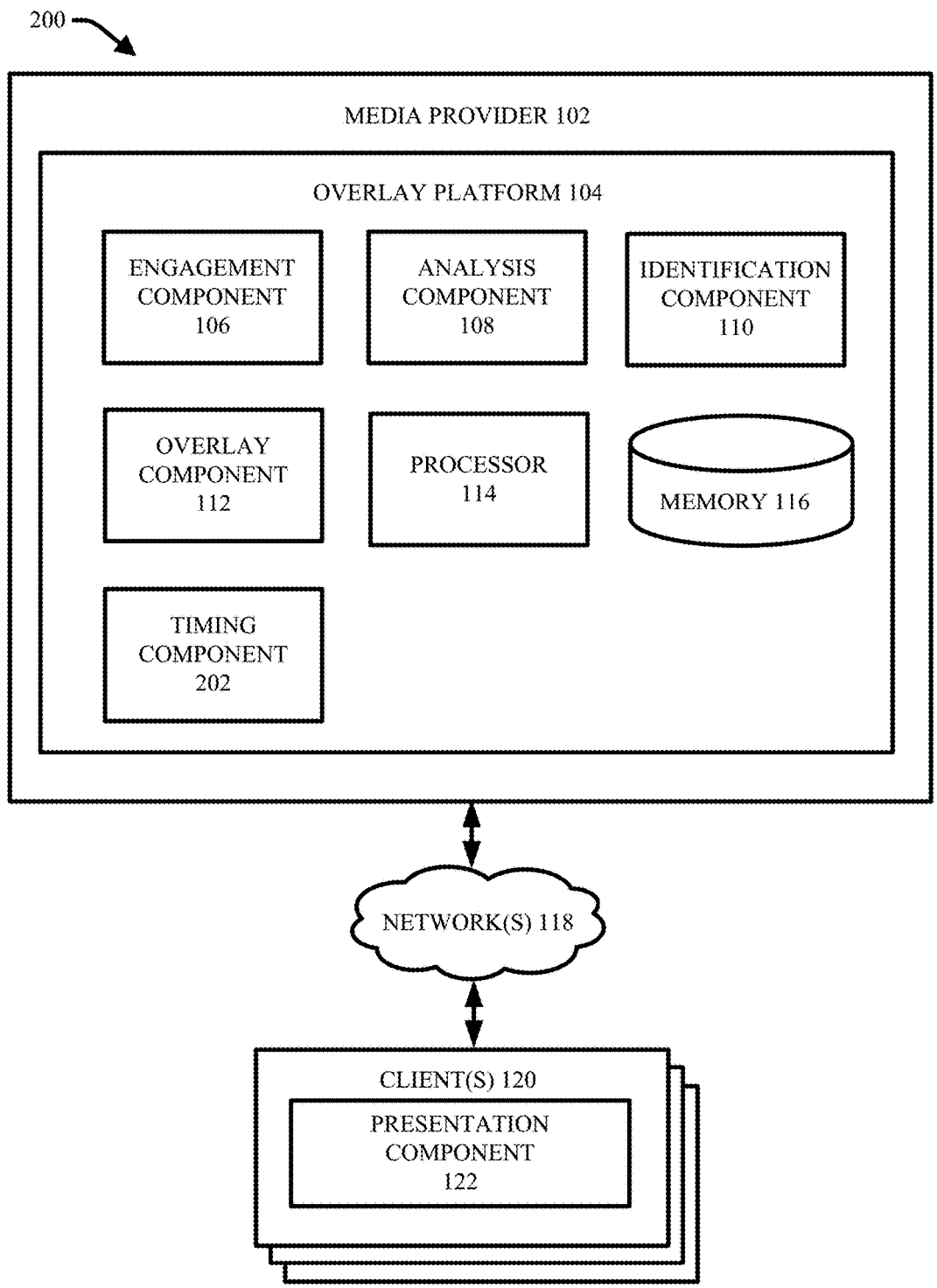
FIG. 2 illustrates another example system for optimizing the timing at which an overlay is displayed over a video in accordance with various aspects and embodiments described herein.

FIG. 2 presents a diagram of another example system 200 for optimizing the timing at which an overlay is displayed over a video in accordance with various aspects and embodiments described herein. System 200 includes same features and functionalities of system 100 with the addition of timing component 202 to overlay platform 104. Repetitive description of like elements employed in respective embodiments of systems and interfaces described herein are omitted for sake of brevity.

Timing component 202 is configured to determine or infer duration of time to display an overlay over a video starting from a segment or frame at which overlay component 112 has selected as an optimal segment or frame to display the overlay. In an aspect, overlay component 112 can configure an overlay for displaying over a video begging at or near a selected segment (e.g., selected based on the user engagement score associated therewith) and lasting for the remaining duration of the video. For example, overlay component 112 can select a segment identified by identification component 110 as having the lowest user engagement score with respect to the other segments of the video and configure the overlay for displaying at a segment of the video just prior to the segment having the lowest user engagement score and lasting for the remaining duration of the video.

However, in another aspect, overlay component 112 can employ timing component 202 to determine or infer duration of time to display the overlay starting at or near a segment selected by overlay component 112. Overlay component 112 can further configure the overlay for displaying over the video for the duration of time determined or inferred by timing component 202. For example, timing component 202 can determine that an overlay should be displayed for 10 seconds, 15 seconds, 20 seconds, etc. In another example, timing component 202 can determine that an overlay should be displayed for X consecutive video segments or frames, where X is a number. Timing component 202 can determine or infer a duration for displaying an overlay based on various factors, including but not limited to: a point in the video where the overlay is to be initially displayed (e.g., the segment or frame identified by identification component 110 and selected by overlay component 112), a duration of the video following the point in the video where the overlay is to be initially displayed, total duration of the video, the user engagement score associated with the point in the video where the overlay is to be initially displayed, user engagement scores associated with segments or frames of the video following the point in the video where the overlay is to be initially displayed, whether additional overlays are configured for display over the video and respective locations and durations for display of the additional overlays, type of overlay, and content of the video.

For example, where an overlay is configured for initial display at a segment of a video near the beginning of the video, displaying the overlay over the remaining duration of the video will likely be distracting to the viewers that do not drop off and/or select the overlay. Thus, based on the remaining amount of time left in the video and user engagement scores associated with the remaining segment in the video, timing component 202 can determine that the overlay should be displayed until the video reaches frame number M (where M is an arbitrary frame number). For example, frame M (and those frames immediately following frame M) could be associated with a high user engagement score. Thus timing component 202 can infer that viewer's attention will likely be regained at or near segment M and displaying of the overlay at that time will be counterproductive. Thus in an aspect, timing component 202 can direct overlay component 112 to display overlays over parts of a video associated with low user engagement scores. For example, frames 45-75, 88-300 and 502-622 could be associated with low user engagement scores. According to this example, timing component 202 can direct overlay component 112 to display an overlay lasting the durations of frames 45-75, 88-300 and 502-622.

Figure 3:
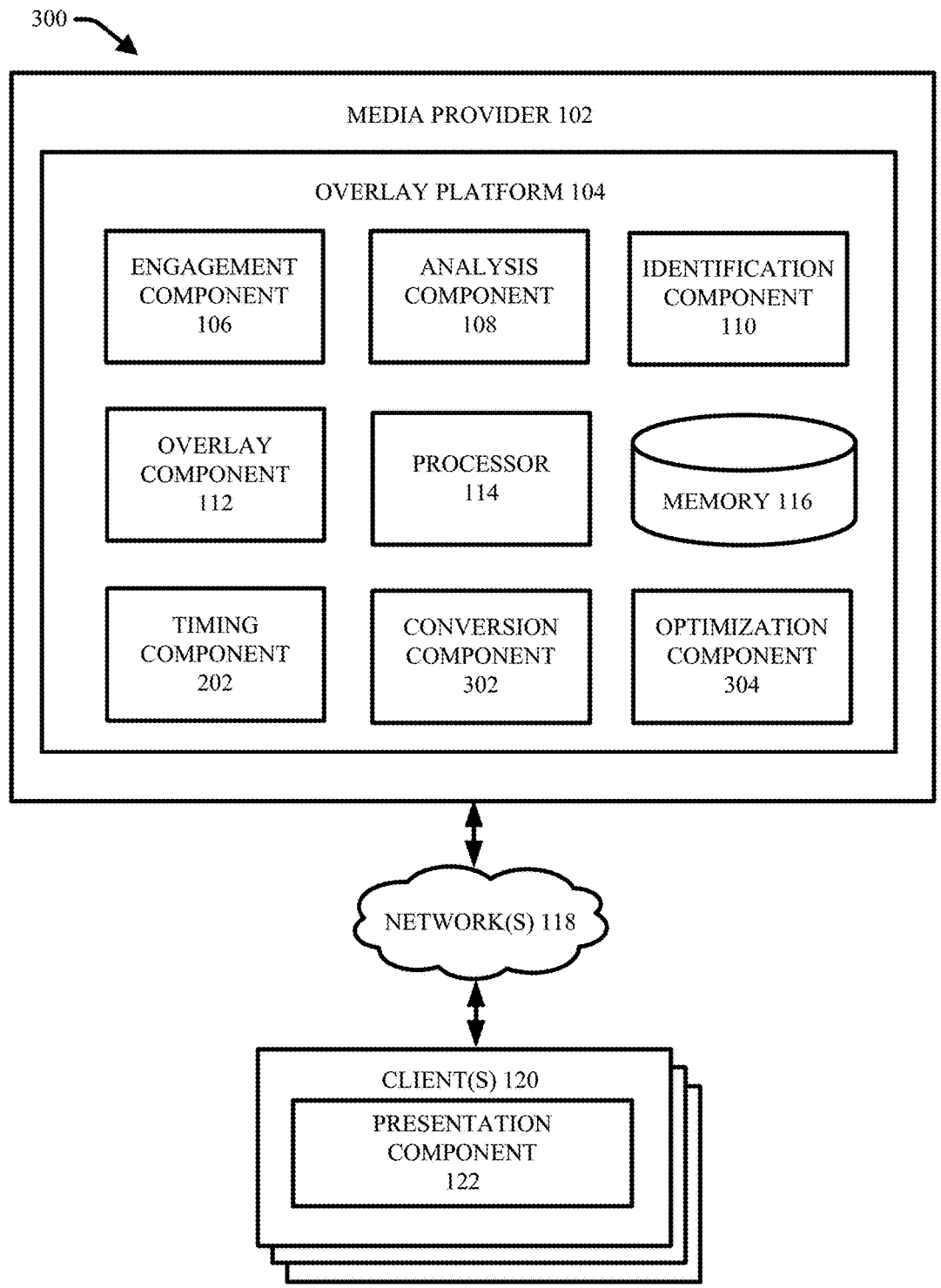
FIG. 3 illustrates another example system for optimizing the timing at which an overlay is displayed over a video in accordance with various aspects and embodiments described herein.

FIG. 3 presents a diagram of another example system 300 for optimizing the timing at which an overlay is displayed over a video in accordance with various aspects and embodiments described herein. System 300 includes same features and functionalities of system 200 with the additions of conversion component 302 and optimization component 304. Repetitive description of like elements employed in respective embodiments of systems and interfaces described herein are omitted for sake of brevity.

As previously noted, in an aspect, overlay component 112 can configure an overlay for displaying at or near a segment of a video at one or more point in the video where viewers tend to stop engaging with or watching the video, as determined based on user retention data. In particular, overlay component 112 can configure an overlay for displaying at or near a video segment having a user engagement score reflective of a highest absolute or relative percentage drop off value as compared to other segments of the video. In an aspect, overlay component 112 configures an overlay for displaying at or near a segment of a video associated with the highest absolute percentage drop off value in order to maximize a total number of clicks or selections of the overlay (e.g., regardless of the number of viewers who see the overlay). In another aspect, overlay component 112 configures an overlay for displaying at or near a segment of a video associated with the highest relative percentage drop off value in order to maximize a selection rate or click through rate (CTR) of the overlay (e.g., maximize selection of the overlay with respect to the number of viewers that see the overlay).

In an aspect, overlay platform 104 is configured to run a gradient ascent learning mechanism on individual videos to optimize the timing of integration of an overlay over the videos in view of overlay conversion. For example, overlay platform 104 can experiment with different timing options for insertion of an overlay over a video to gradually improve the timing of insertion of the overlay by selecting the timing option which outperforms the others with respect to total number of clicks and/or CTR. According to this aspect, overlay platform can include conversion component 302 and optimization component 304.

Conversion component 302 is configured to track the total number of clicks and/or the CTR of an overlay configured for initial display at different segments or frames in a video. For example, overlay component 112 can configure an overlay for displaying at different experimental points in a video. Each of the experimental points can be associated with relatively high drop off percentage values (e.g., absolute and/or relative). Each time the video is played, the overlay can be configured for displaying at one of the experimental points. The different experimental points can be subjected to equal or substantially equal test groups (e.g., with respect to number of viewers that begin watching the video with the overlay and type of viewers). Conversion component 302 can then track the number of times the overlay is selected at the different experimental points with respect to the number of viewers who have viewed the video and/or the number of viewers that were watching the video at the time the overlay was presented. Conversion component 302 can also track the actual points in the video at which the overlay is selected (e.g., within the duration of display of the overlay).

Optimization component 304 is configured to analyze information tracked by conversion component 302 and determine or infer an optimal position in a video to insert an overlay based on the information. For example, optimization component 304 can identify one of the experimental points associated with the highest number of total clicks and/or the highest CTR. In another example, optimization component 304 can identify specific points in the video when an overlay is most frequently selected. In an aspect, optimization component 304 can direct overlay component 112 to automatically adjust the point in a video where an overlay is inserted based on learned data regarding a point or points in the video associated with highest total overlay conversion and/or highest CTR. For example, where an overlay is configured for display over a video at different experimental points for various percentages of playing time, optimization component 304 can identify one of the experimental points associated with the highest total conversion or the highest CTR and direct the overlay component 112 to configure the overlay for displaying at the one of the experimental points for 100 percent of the playing time.

Figure 4:
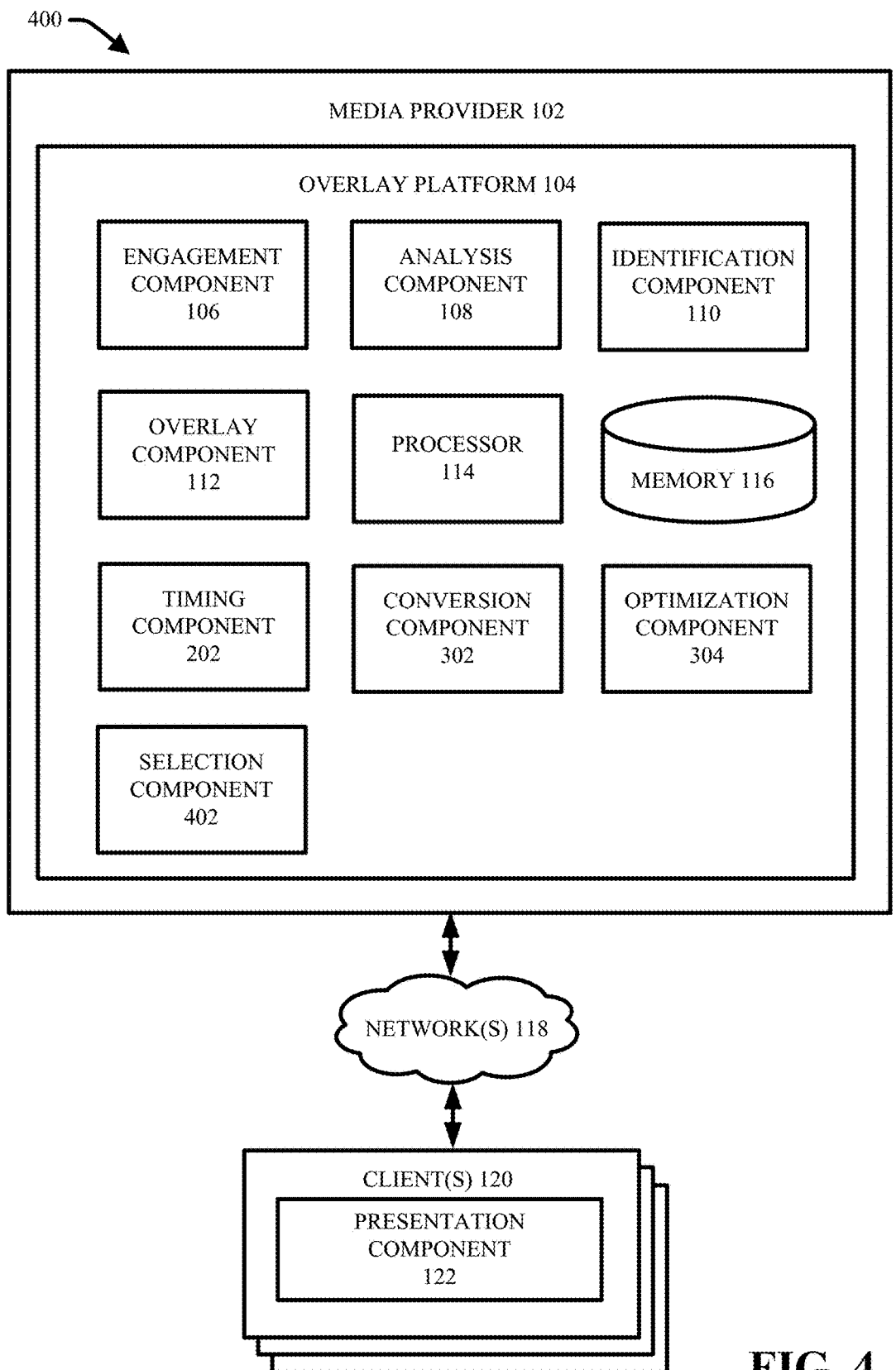
FIG. 4 illustrates another example system for optimizing the timing at which an overlay is displayed over a video in accordance with various aspects and embodiments described herein.

FIG. 4 presents a diagram of another example system 400 for optimizing the timing at which an overlay is displayed over a video in accordance with various aspects and embodiments described herein. System 400 includes same features and functionalities of system 300 with the addition of selection component 402 to overlay platform. Repetitive description of like elements employed in respective embodiments of systems and interfaces described herein are omitted for sake of brevity.

In an aspect, the overlay that overlay component 112 is configured to integrate into a video is predetermined. For example, an owner or promoter of a video can choose the overlay to be integrated into the video. For instance, a user can create a collection of videos for sharing with others and associate the videos with a profile of the user. The profile can embody a channel or collection of videos provided by and/or associated with the user and made available to other users via media provider 102. In an aspect, the user can select an overlay with a link to a channel homepage and apply the overlay for display over each of the videos on the user's channel to cross promote the user's channel within the respective videos. In another aspect, the user can select an overlay with a link to a video on provided on the user's channel and apply the overlay for display over each of the videos on the user's channel to cross promote the video. For example, the user could select a new video recently added to the user's channel to feature in each of the videos of the user's channel using an overlay with a thumbnail representing the video and link to the new video. According to this example, overlay component 112 can be configured to integrate the overlay within the respective videos of the user's channel at the optimal points in the respective videos using the mechanisms described herein to enhance the CTR of the overlay prior to viewership drop off.

However, in another aspect, the overlay that overlay component 112 is configured to integrate into a video can be selected by selection component 402. According to this aspect, selection component 402 can automatically select one or more overlays to integrate within a video based on a variety of factors, including but not limited to: content of the video, type of video, intended audience of the video, duration of the video, preferences of an owner or promoter of the video, user engagement scores associated with respective segments of the video, where drop off points in the video occur, user type associate with respective drop off points (e.g., with respect to demographics, preferences, social groups, etc.) or context of a viewer of the video.

For example, where a video is associated with a substantially high drop off percentage at a particular point, selection component 402 can select an overlay that is considered highly enticing to viewers and frequently selected, regardless of the video in which it is integrated and/or position in the video in which it is integrated. In another example, selection component 402 can select an overlay based on a type of audience (e.g., based on demographics, preferences, social groups, etc.) associated with a drop off point at which the overlay is to be integrated. For instance, where most users who drop off at around video frames 88-92 are teenage boys, selection component 402 can select an overlay for integration at around video frames 88-92 that is highly popular amongst teenage boys.

Figure 5:
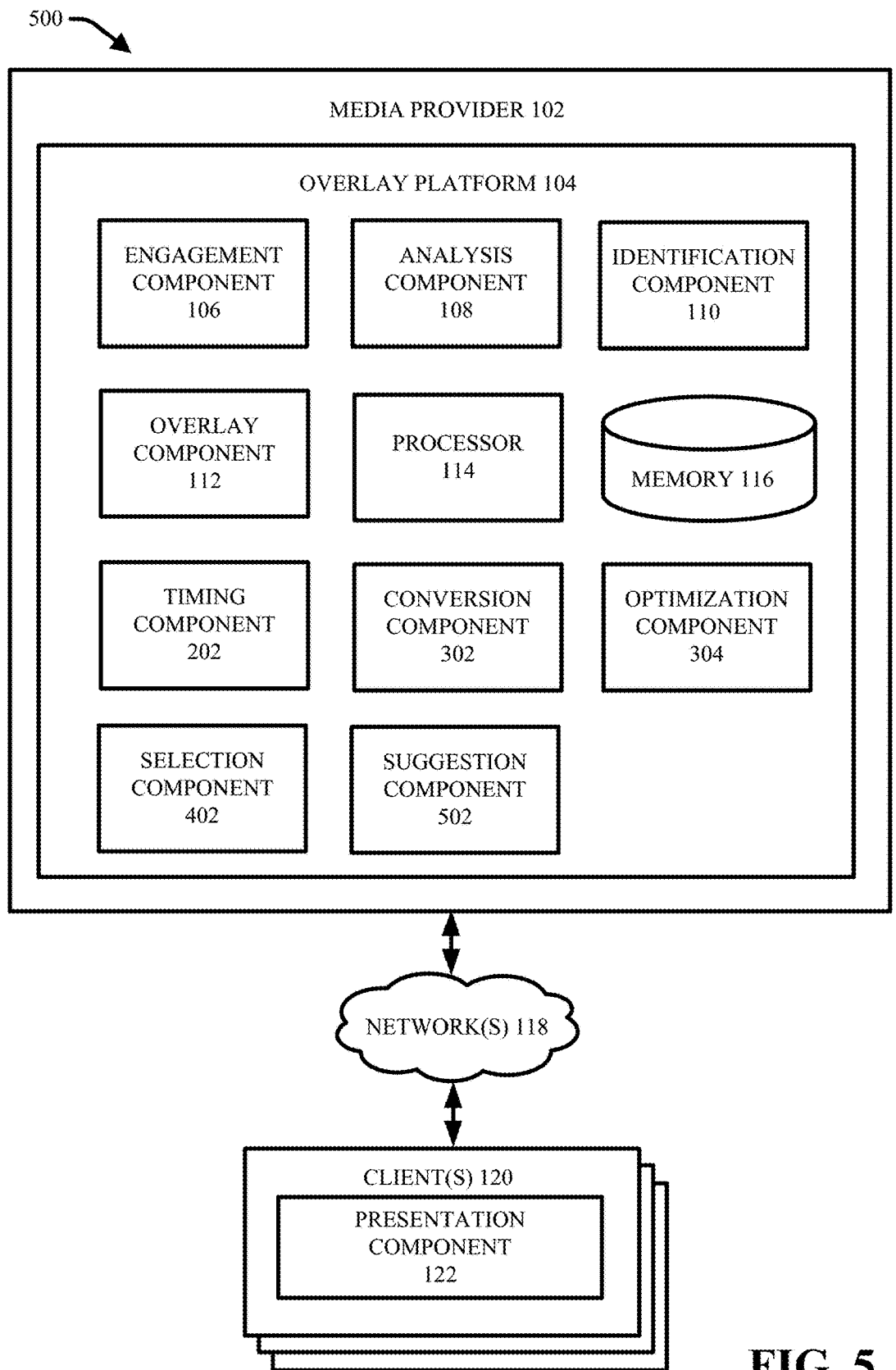
FIG. 5 illustrates another example system for optimizing the timing at which an overlay is displayed over a video in accordance with various aspects and embodiments described herein.

FIG. 5 presents a diagram of another example system 500 for optimizing the timing at which an overlay is displayed over a video in accordance with various aspects and embodiments described herein. System 500 includes same features and functionalities of system 500 with the addition of suggestion component 502 to overlay platform 104. Repetitive description of like elements employed in respective embodiments of systems and interfaces described herein are omitted for sake of brevity.

Suggestion component 502 is configured to provide an owner or promoter of a video (e.g., a user who has control and authority over publication of the video via media provider 102) with suggestions regarding timing of integration of an overlay over the video, size and position of the overlay and/or what overlay to select for integration over the video. For example, rather than automatically configuring an overlay for integration over a video at an optimal video frame or frames determined or inferred by overlay platform 104, suggestion component 502 can provide an owner or promoter of the video with information indicating the optimal frame or frames and/or an optimal duration for display of the overlay. In an aspect, the information can indicate projected overlay conversion (e.g., total conversion and/or CTR) associated with integration of the overlay at the suggested optimal video frame or frames. In another example, suggestion component 502 can suggest a specific video or content item to promote in an overlay (e.g., as determined or inferred by selection component 402). The owner or promoter of the video can then chose whether to apply a suggestion provided by suggestion component 502.

Figure 6:
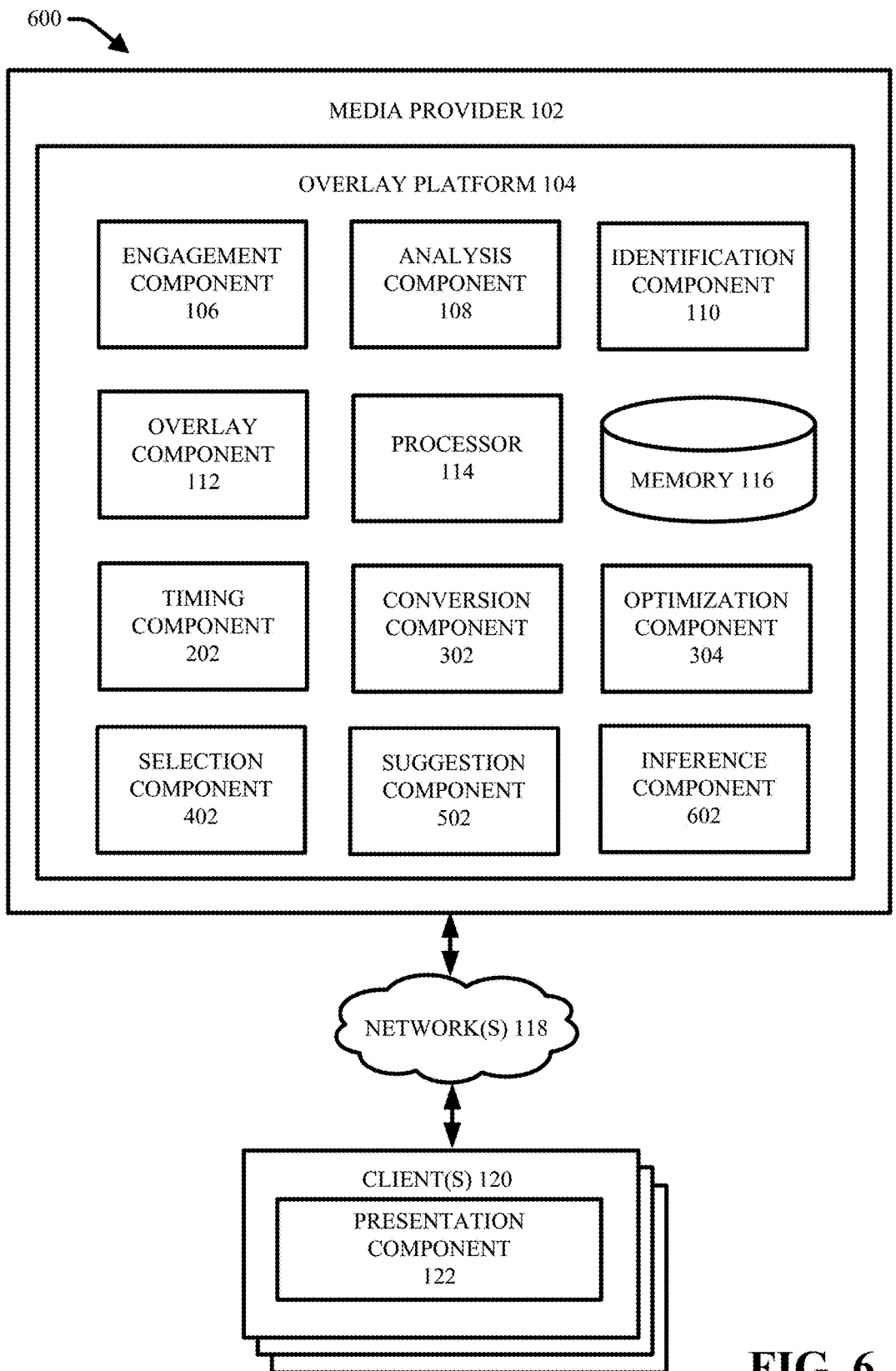
FIG. 6 illustrates another example system for optimizing the timing at which an overlay is displayed over a video in accordance with various aspects and embodiments described herein.

FIG. 6 presents a diagram of another example system 200 for optimizing the timing at which an overlay is displayed over a video in accordance with various aspects and embodiments described herein. System 200 includes same features and functionalities of system 100 with the addition of inference component 602. Repetitive description of like elements employed in respective embodiments of systems and interfaces described herein are omitted for sake of brevity.

Inference component 602 is configured to provide for or aid in various inferences or determinations associated with aspects of overlay platform 104. In an aspect, all or portions of media provider 102 can be operatively coupled to inference component 602. Moreover, inference component 602 can be granted access to all or portions of media provider, client device(s) 122 and other sources accessible via a network 118.

In an aspect, analysis component 108 can employ inference component 602 to infer user engagement levels to associate with respective segments of a video based on received user retention information and user engagement signals. For example, inference component 602 can analyze received information pertaining to user engagement and/or disengagement with a segment of a video to infer an average level of user engagement with the segment. In another aspect, identification component 110 and/or overlay component 112 can employ inference component 602 to infer which segments or frames of a video to select as optimal points in the video for insertion of an overlay to optimize overlay conversion and/or CTR and timing component 202 can employ inference component to infer a duration to display the overlay. Optimization component 304, selection component 402 and suggestion component 502 can also employ inference component 602 to infer optimal positions for integration of an overlay, to infer what overlay to apply to a video or point in the video, and to infer suggestions to offer an owner or promoter of the video regarding overlay timing and selection.

In order to provide for or aid in the numerous inferences described herein, inference component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
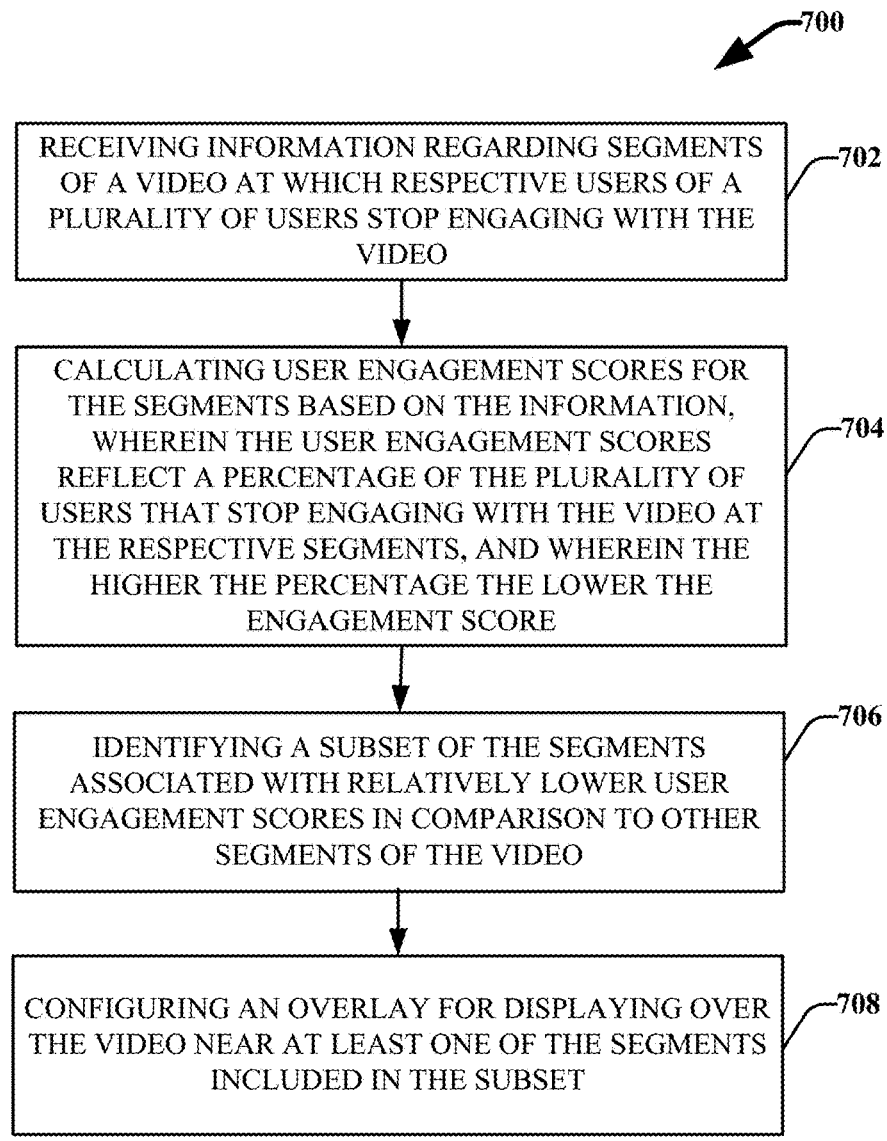
FIG. 7 presents a flow diagram of an example method for optimizing the timing at which an overlay is displayed over a video in accordance with various aspects and embodiments described herein.
Figure 8:
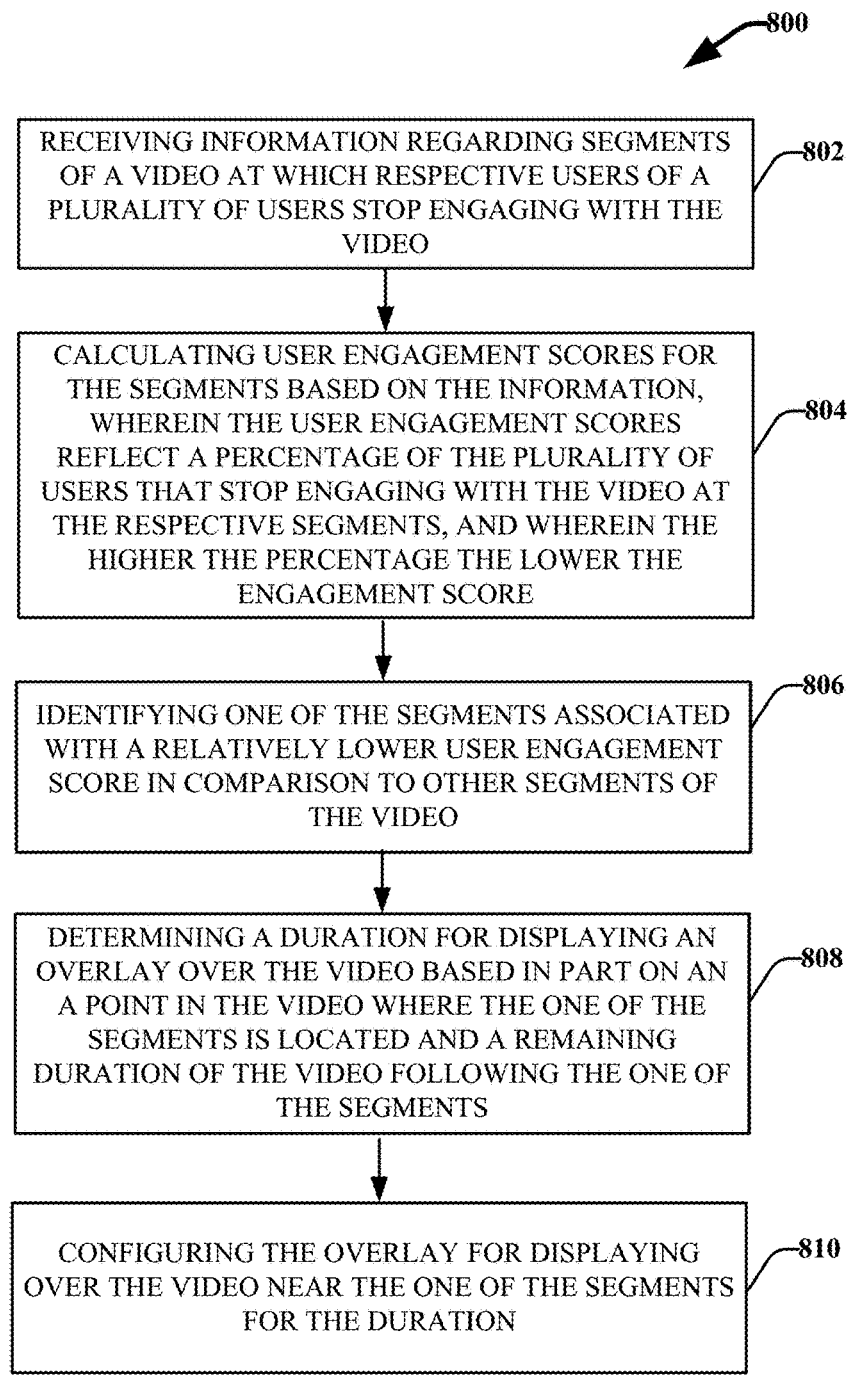
FIG. 8 presents a flow diagram of another example method for optimizing the timing at which an overlay is displayed over a video in accordance with various aspects and embodiments described herein.
Figure 9:
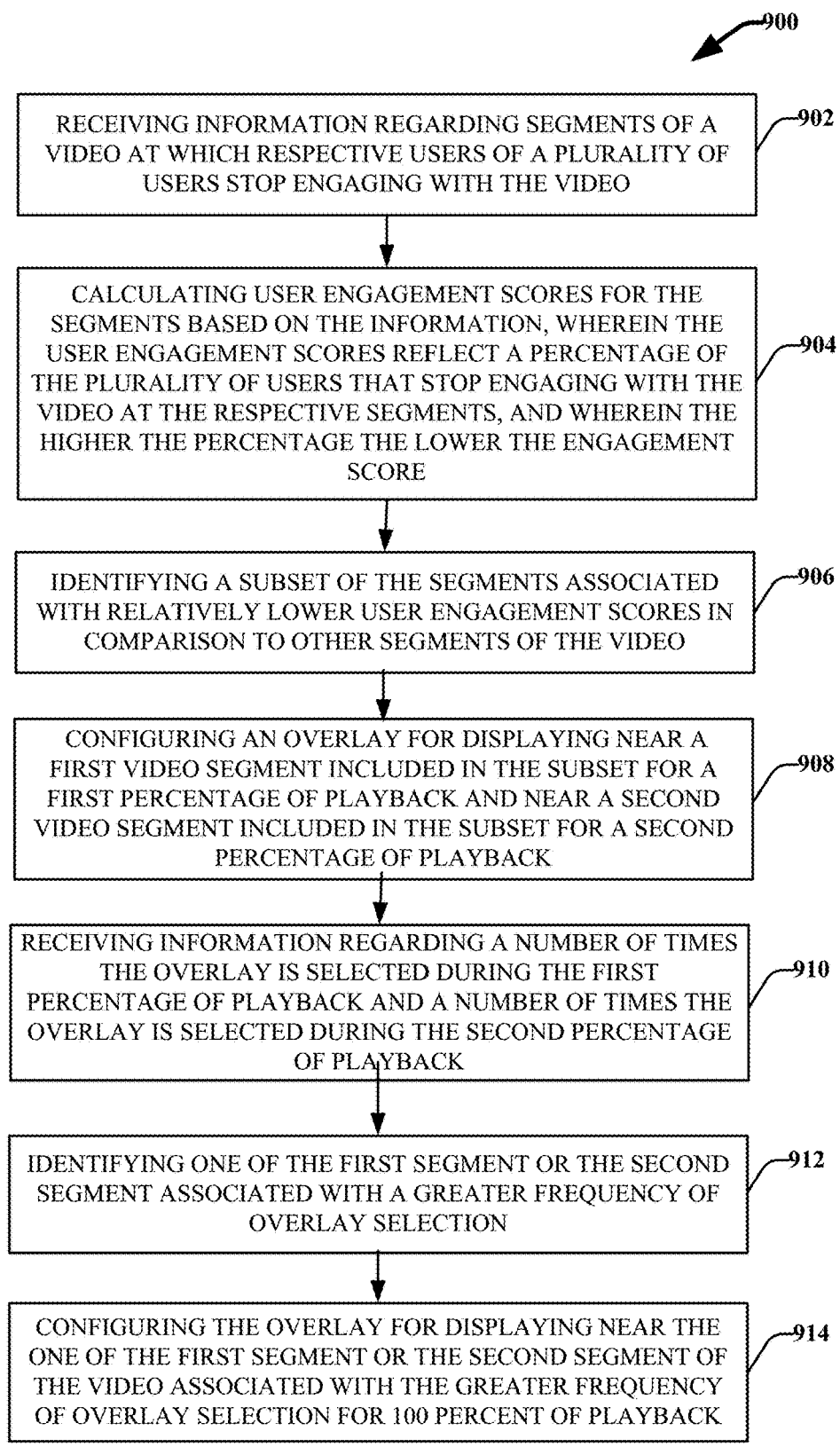
FIG. 9 presents a flow diagram of another example method for optimizing the timing at which an overlay is displayed over a video in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for optimizing the timing at which an overlay is displayed over a video, in accordance with various aspects and embodiments described herein. At 702 information regarding segments of a video at which respective users of a plurality of users stop engaging with the video is received (e.g., via engagement component 106). At 704 user engagement scores for the segments are calculated based on the information, wherein the user engagement scores reflect a percentage of the plurality of users that stop engaging with the video at the respective segments, and wherein the higher the percentage the lower the engagement score (e.g., using analysis component 108). At 706, a subset of the segments associated with relatively lower user engagement scores in comparison to other segments of the video are identified (e.g., using identification component 110). At 708, an overlay is configured for displaying over the video near at least one of the segments included in the subset (e.g., using overlay component 112).

FIG. 8 illustrates a flow chart of another example method 800 for optimizing the timing at which an overlay is displayed over a video, in accordance with various aspects and embodiments described herein. At 802 information regarding segments of a video at which respective users of a plurality of users stop engaging with the video is received (e.g., via engagement component 106). At 804 user engagement scores for the segments are calculated based on the information, wherein the user engagement scores reflect a percentage of the plurality of users that stop engaging with the video at the respective segments, and wherein the higher the percentage the lower the engagement score (e.g., using analysis component 108). At 806, one of the segments associated with a relatively lower user engagement score in comparison to other segments of the video are identified (e.g., using identification component 110). At 808, a duration for displaying an overlay over the video is determined based in part on a point in the video where the one of the segments is located and a remaining duration of the video following the one of the segments (e.g., using timing component 202). At 810, the overlay is configured for displaying over the video near the one of the segments for the duration (e.g., using overlay component 112).

FIG. 9 illustrates a flow chart of another example method 900 for optimizing the timing at which an overlay is displayed over a video, in accordance with various aspects and embodiments described herein. At 902 information regarding segments of a video at which respective users of a plurality of users stop engaging with the video is received (e.g., via engagement component 106). At 904 user engagement scores for the segments are calculated based on the information, wherein the user engagement scores reflect a percentage of the plurality of users that stop engaging with the video at the respective segments, and wherein the higher the percentage the lower the engagement score (e.g., using analysis component 108). At 906, a subset of the segments associated with relatively lower user engagement scores in comparison to other segments of the video are identified (e.g., using identification component 110). At 908, an overlay is configured for displaying near a first video segment included in the subset for a first percentage of playback and near a second video segment included in the subset for a second percentage of playback (e.g., using overlay component 112). At 910, information is received regarding a number of times the overlay is selected during the first percentage of playback and a number of times the overlay is selected during the second percentage of playback (e.g., using conversion component 302). At 912, one of the first segment or the second segment associated with a greater frequency of overlay selection is identified (e.g., using optimization component 304). At 914, the overlay is configured for displaying near the one of the first segment or the second segment of the video associated with the greater frequency of overlay selection for 100 percent of playback (e.g., using overlay component 112).

Example of Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
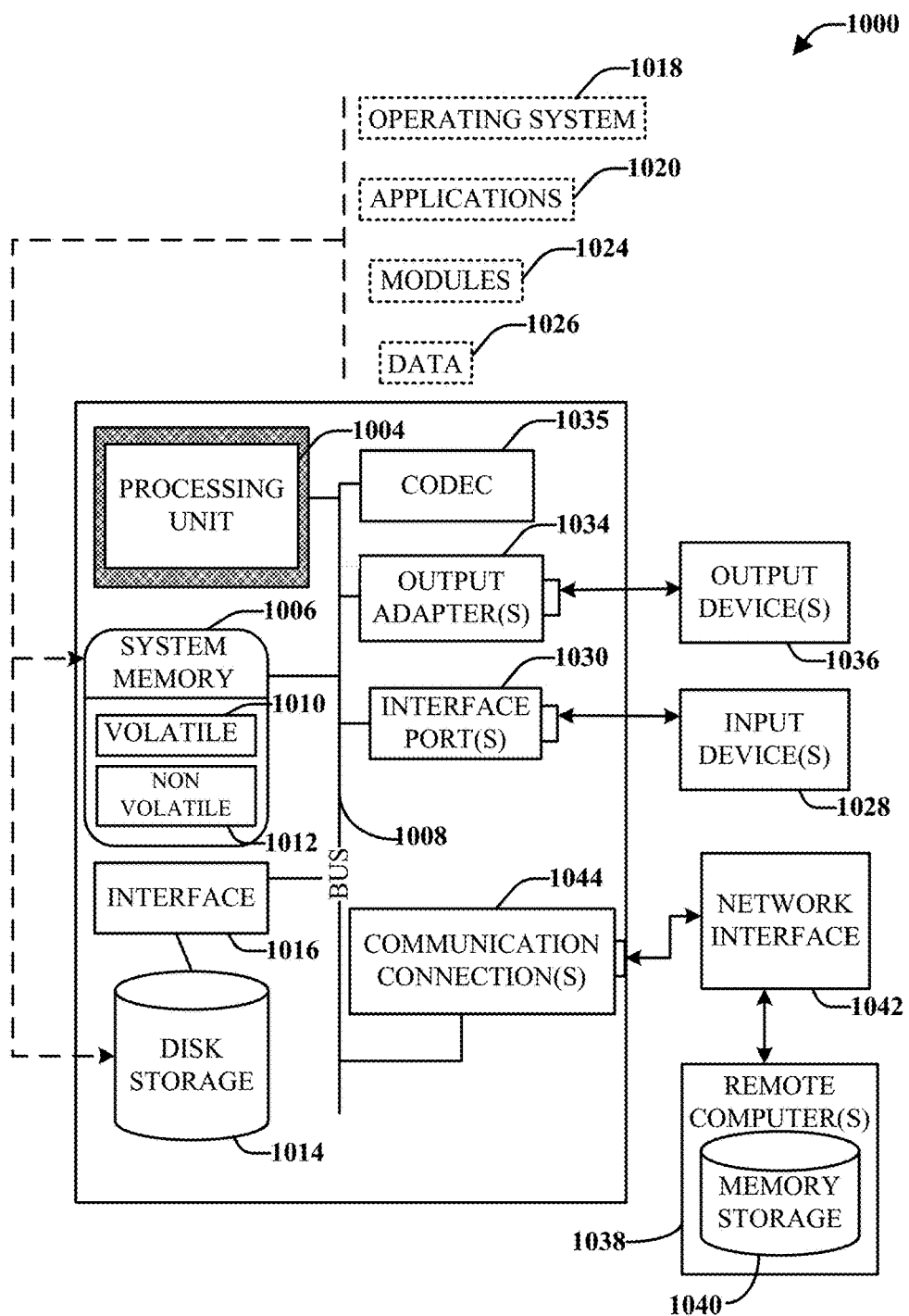
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 10104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1011. Disk storage 1011 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1011 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1011 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1011, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1011. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
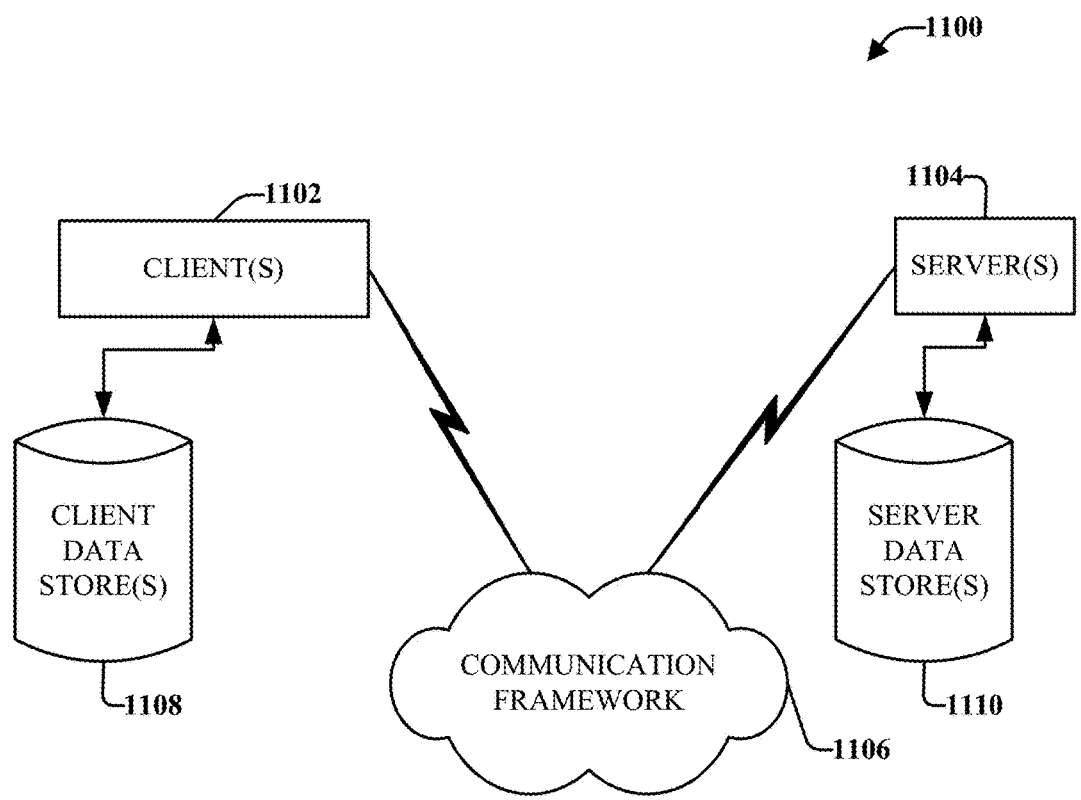
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client (s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory; and
   a hardware processor that, when executing computer executable instructions stored in the memory, is configured to:
   receive engagement information associated with each of a plurality of frames of a video content item;
   calculate, for each frame of the plurality of frames of the video content item, an engagement score based on the received engagement information indicating that users have stopped engaging with a frame of the video content item;
   determine a first subset of the plurality of frames based on the first engagement score;
   generate an overlay for presentation with the video content item in which the overlay is positioned over at least one of the frames included in the first subset of the plurality of frames, wherein the overlay is positioned over the video content item for a duration based on the engagement score such that the overlay is not positioned over a second subset of the plurality of frames having a corresponding engagement score outside of the calculated engagement score; and
   cause the overlay to be displayed over the video content item for the duration, wherein the overlay is positioned over the at least one of the frames included in the first subset of the plurality of frames.

2. The system of claim 1, wherein the hardware processor is further configured to calculate a second engagement score based on engagement information indicating that user are engaged with the frame of the video content item.

3. The system of claim 2, wherein the overlay is generated such that the overlay is not positioned over at least one of the frames having the corresponding engagement score within the second engagement score.

4. The system of claim 1, wherein the first subset of the plurality of frames is sequentially ordered and the overlay is configured to be positioned over the video content item during each of the frames included in the first subset of the plurality of frames.

5. The system of claim 1, wherein the overlay comprises a hyperlink, and the hardware processor is further configured to:
   receive information regarding a number of times the overlay is selected during playback of the video content item; and
   identify another frame of the video content item for displaying the overlay based on the number of times the overlay is selected during the playback.

6. The system of claim 1, wherein the overlay comprises a hyperlink and the overlay is further configured to display the hyperlink at a first frame within the first subset of the plurality of frames for a first percentage of playback and to display the hyperlink at a second frame within the first subset of the plurality of frames video frame for a second percentage of playback.

7. The system of claim 6, wherein the hardware processor is further configured to:
   receive information regarding a first number of times the overlay is selected during the first percentage of playback and a second number of times the overlay is selected during the second percentage of playback;
   identify one of the first frame and the second frame as having a greater frequency of overlay selection; and
   modify the overlay such that the overlay is positioned over the frame from the first subset of the plurality of frames that is identified as having the greater frequency of overlay selection.

8. A method, comprising:
   receiving, using a hardware processor, engagement information associated with each of a plurality of frames of a video content item;
   calculating, for each frame of the plurality of frames of the video content item, using the hardware processor, an engagement score based on the received engagement information indicating that users have stopped engaging with a frame of the video content item;
   determining, using the hardware processor, a first subset of the plurality of frames based on the first engagement score;
   generating, using the hardware processor, an overlay for presentation with the video content item in which the overlay is positioned over at least one of the frames included in the first subset of the plurality of frames, wherein the overlay is positioned over the video content item for a duration based on the engagement score such that the overlay is not positioned over a second subset of the plurality of frames having a corresponding engagement score outside of the calculated engagement score; and
   causing, using the hardware processor, the overlay to be displayed over the video content item for the duration, wherein the overlay is positioned over the at least one of the frames included in the first subset of the plurality of frames.

9. The method of claim 8, further comprising calculating a second engagement score based on engagement information indicating that user are engaged with the frame of the video content item.

10. The method of claim 9, wherein the overlay is generated such that the overlay is not positioned over at least one of the frames having the corresponding engagement score within the second engagement score.

11. The method of claim 8, wherein the first subset of the plurality of frames is sequentially ordered and the overlay is configured to be positioned over the video content item during each of the frames included in the first subset of the plurality of frames.

12. The method of claim 8, wherein the overlay comprises a hyperlink and wherein the method further comprises:
receiving information regarding a number of times the overlay is selected during playback of the video content item; and
identifying another frame of the video content item for displaying the overlay based on the number of times the overlay is selected during the playback.

13. The method of claim 8, wherein the overlay comprises a hyperlink and the overlay is further configured to display the hyperlink at a first frame within the first subset of the plurality of frames for a first percentage of playback and to display the hyperlink at a second frame within the first subset of the plurality of frames video frame for a second percentage of playback.

14. The method of claim 13, further comprising:
receiving information regarding a first number of times the overlay is selected during the first percentage of playback and a second number of times the overlay is selected during the second percentage of playback;
identifying one of the first frame and the second frame as having a greater frequency of overlay selection; and
modifying the overlay such that the overlay is positioned over the frame from the first subset of the plurality of frames that is identified as having the greater frequency of overlay selection.

15. A non-transitory computer-readable medium containing computer executable instructions that, when executed by a processor, cause the processor to perform a method for television related searching, the method comprising:
receiving engagement information associated with each of a plurality of frames of a video content item;
calculating, for each frame of the plurality of frames of the video content item, an engagement score based on the received engagement information indicating that users have stopped engaging with a frame of the video content item;
determining a first subset of the plurality of frames based on the first engagement score;
generating an overlay for presentation with the video content item in which the overlay is positioned over at least one of the frames included in the first subset of the plurality of frames, wherein the overlay is positioned over the video content item for a duration based on the engagement score such that the overlay is not positioned over a second subset of the plurality of frames having a corresponding engagement score outside of the calculated engagement score; and
causing the overlay to be displayed over the video content item for the duration, wherein the overlay is positioned over the at least one of the frames included in the first subset of the plurality of frames.

16. The non-transitory computer-readable medium of claim 15, wherein the method further comprises calculating a second engagement score based on engagement information indicating that user are engaged with the frame of the video content item.

17. The non-transitory computer-readable medium of claim 16, wherein the overlay is generated such that the overlay is not positioned over at least one of the frames having the corresponding engagement score within the second engagement score.

18. The non-transitory computer-readable medium of claim 15, wherein the first subset of the plurality of frames is sequentially ordered and the overlay is configured to be positioned over the video content item during each of the frames included in the first subset of the plurality of frames.

19. The non-transitory computer-readable medium of claim 15, wherein the overlay comprises a hyperlink and wherein the method further comprises:
receiving information regarding a number of times the overlay is selected during playback of the video content item; and
identifying another frame of the video content item for displaying the overlay based on the number of times the overlay is selected during the playback.

20. The non-transitory computer-readable medium of claim 15, wherein the overlay comprises a hyperlink and the overlay is further configured to display the hyperlink at a first frame within the first subset of the plurality of frames for a first percentage of playback and to display the hyperlink at a second frame within the first subset of the plurality of frames video frame for a second percentage of playback.

21. The non-transitory computer-readable medium of claim 20, wherein the method further comprises:
receiving information regarding a first number of times the overlay is selected during the first percentage of playback and a second number of times the overlay is selected during the second percentage of playback;
identifying one of the first frame and the second frame as having a greater frequency of overlay selection; and
modifying the overlay such that the overlay is positioned over the frame from the first subset of the plurality of frames that is identified as having the greater frequency of overlay selection.

* * * * *